(12) United States Patent
Cai et al.

(10) Patent No.: US 6,178,234 B1
(45) Date of Patent: Jan. 23, 2001

(54) INTELLIGENT NETWORKED, AUTOMATED TELEPHONE CALLING CARD SERVICE SYSTEM CAPABLE OF BAILOUT TO AN OPERATOR

(75) Inventors: Yigang Cai, Naperville; Shiyan Hua, Wheaton; Wing H. Huen, Aurora, all of IL (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/249,282

(22) Filed: Feb. 11, 1999

(51) Int. Cl.[7] .................. H04M 17/00; H04M 15/00; H04M 7/00
(52) U.S. Cl. .................. 379/114; 379/115; 379/145; 379/223; 379/228; 379/230
(58) Field of Search .................. 379/112, 114, 379/144, 115, 222, 223, 221, 230, 198, 191, 220, 229, 228, 126, 145

(56) References Cited

U.S. PATENT DOCUMENTS

| | | | |
|---|---|---|---|
| 5,003,584 | * | 3/1991 | Benyacar et al. ............ 379/119 |
| 5,187,710 | * | 2/1993 | Chau et al. .................. 379/114 |
| 5,524,142 | * | 6/1996 | Lewis et al. ................. 379/112 |
| 5,537,464 | * | 7/1996 | Lewis et al. ................. 379/114 |
| 5,894,510 | * | 4/1999 | Felger ......................... 379/114 |

* cited by examiner

Primary Examiner—Curtis A. Kuntz
Assistant Examiner—Rexford N. Barnie

(57) ABSTRACT

A telephone calling card (prepaid or postpaid) service system with an intelligent network (IN) for automated call processing has a bailout capability for bailing out a call placed directly to the IN, to an operator for assistance upon the occurrence of predefined contingencies. A service control point (SCP) in the IN interfaces with a switch containing a service switching point (SSP) for switching a call to its destination via the ETSI INAP or ITU INAP protocol. The switch also contains an operator service position system (OSPS), and an originating call processor (OCP) coupled to both the SSP and OSPS. After the occurrence of a bailout condition (resulting from a call being unauthorized as determined by the SCP), the SCP sends a destination routing address to the SSP including a network routing address (NRA) indicating which OSPS to direct the call for eventual operator assistance (via the SSP). In a first method, an NRA matching the OSPS in the same switch causes the call to be routed to the OSPS with an internal message for operator assistance. In a second method, an NRA not matching the OSPS in the current switch (i.e., the NRA matches an OSPS residing in another switch), causes the OCP to transfer the call to another switch having an OSPS for call processing with operator assistance.

10 Claims, 6 Drawing Sheets

DESTINATION ROUTING ADDRESS CONFIGURATION

| 8th bit | 7th bit | 6th bit | 5th bit | 4th bit | 3rd bit | 2nd bit | 1st bit | |
|---|---|---|---|---|---|---|---|---|
| Odd/Even | Nature of Address Indicator ("operator") | | | | | | | 1st byte |
| INN indicator | Number Planning indicator | | | spare | | | | 2nd byte |
| 2nd digit of NRA | | | | 1st digit of NRA | | | | 3rd byte |
| 4th digit of NRA | | | | 3rd digit of NRA | | | | 4th byte |
| 6th digit of NRA | | | | 5th digit of NRA | | | | 5th byte |
| Number of digits of CC number and PIN (last 4 digits) | | | | bailout reason | | | | 6th byte |
| 2nd digit of CC No. | | | | 1st digit of CC No. | | | | 7th byte |
| | | | | | | | | • • • • • |

FIGURE 2

INTELLIGENT NETWORKED, AUTOMATED TELEPHONE CALLING CARD SERVICE SYSTEM CAPABLE OF BAILOUT TO AN OPERATOR

BACKGROUND OF THE INVENTION

1. Field of the Invention

The present invention generally relates to networks for providing telephone services. More particularly, the present invention relates to improvements in telephone services accessible with pre-paid and post-paid calling cards.

2. Background of Related Art

Telephone calling cards store information used in connection with the delivery of, and billing for telephone services. "Pre-paid" calling cards are associated with an account having a fixed amount of charges allowable. "Post-paid" calling cards are associated with accounts where the charges are paid in arrears for each billing cycle.

Calling cards vary in complexity from so-called "smart cards" to simple magnetic strip cards. Smart cards contain memory locations for storing and updating information regarding the account or card user, and a microprocessor for performing various operations. Smart cards are connected to an intelligent terminal which interfaces with a telephone network. The actual coupling between the smart card and the intelligent terminal can be physical, inductive or capacitive. The control of a telephone transaction using such a card may be distributed between the network and the card.

Notwithstanding the above, many calling cards lack a microprocessor, limiting the operation of the card to transferring and storing information upon direction from the network. In perhaps the most common form, a calling card is simpler yet, containing only a read-only magnetic strip storing a unique card number, and the like. In the case of the latter type of calling card, the network performs most of the operations necessary to complete a transaction.

In a typical calling card transaction, a user desiring to place a call takes a telephone off-hook and dials an access number, perhaps followed by the number printed on the calling card (corresponding to an account), a personal identification number (PIN) for security purposes, and then the destination telephone number. Alternatively, information such as the calling card number can be read by a card reader or magnetic strip reader if such a device is attached to the user's telephone terminal.

A central database associated with the intelligent network stores all of the calling card numbers supported by the system, along with a correspond-stored in memory. If the input PIN matches the stored PIN, the intelligent network instructs a switch in the system to complete the connection and establish the desired call. If the PIN transmitted by the user does not match the stored PIN, the call is refused, whereupon the user is either given further opportunities to enter the correct PIN, or the call is terminated, or other action is taken, depending on the "call flow." The call flow of a telephone system is a comprehensive algorithm controlling logic used to establish and maintain a call.

Current telephone calling card service systems are of two major types. In a first type common in North America, a calling card customer desiring to place a call is connected to a switch housing an operator service position system (OSPS) and a service switching point (SSP) coupled to the OSPS. Also included in such a system is calling card database storing calling card account numbers and their corresponding PINs.

Via the OSPS, a telephone operator assists the customer by prompting the customer to enter such information as a calling card number, PIN and destination number (DN) to which the originating call is to be connected. The OSPS retrieves calling card account and PIN information from the calling card database and compares it with the information provided by the customer to determine whether the call is valid. If valid, the call is connected to the destination number. If invalid, the operator can ask or re-prompt the customer to enter new information. For example, if the PIN input by the customer does not match the stored PIN, the OSPS can request that the customer re-enter the PIN or enter a new calling card/PIN combination. While this type of system has advantages, it requires all calling card traffic to be routed through the OSPS, taxing the OSPS resources, and increasing the likelihood of delays, fraud, and other forms of inefficient service due to human error.

A second major type of calling card service system, used internationally, for example, utilizes an intelligent network (IN) for automated processing of calling card transactions. In such a system, the customer dials a service access code (SAC) to connect to the IN for processing of a call. The IN receives information such as the calling line identification (CLI) from the origination telephone line, and the calling card number, PIN, and destination number from the customer.

A service control point (SCP) compares information received from the customer with information stored in its database (calling card number, PIN, etc.). The SCP decides whether a call is authorized, and if so directs the IN to connect the call to the destination number. The SCP and SSP of such a system may be connected with a high-speed link utilizing, for example, the Intelligent Network Application Protocol (INAP), as approved by the European Telecommunications Standards Institute (ETSI) and International Telecommunication Unit (ITU).

This type of system has advantages, such as being automated for high transaction processing speed and reduced errors. However, when problems occur which are unanticipated by the system, the call is usually terminated, resulting in a loss of revenue to the system owner, and frustration by the customer.

Accordingly, what is sorely lacking in the prior art is a flexible telephone calling card service system combining the speed and precision of an automated, intelligent networked system, and the ability to facilitate operator-assisted calls when desired or necessary to prevent lost transactions. Further, a global calling card service system is needed which can more efficiently service calling card customers placing calls.

In furtherance of the above aspirations, what is also needed is a bailout method for bailing out to a telephone operator from an IN, calls determined by the IN to be unauthorized. During a bailout operation, the IN needs to direct the bailed-out call to an appropriate location, and provide necessary processing information. Also, such a system should be robust in that when bailed-out calls are transferred to switches lacking an OSPS for facilitating telephone operator processing, the system automatically transfers the call to a capable switch. Again, this avoids premature call termination for failure of the system to connect the customer to the desired destination number, which may lead to customer frustration and loss of revenue for the system owner(s).

SUMMARY OF THE INVENTION

In view of the above-identified problems and limitations of the prior art, the present invention provides a telephone calling card service system for processing telephone calls to be charged to calling card accounts. The system at least includes the following elements. An input telephonic device operatively coupled to an origination telephone line, has an input telephonic device with an alphanumeric information generator for at least transmitting a calling card account card number, security information, and a destination telephone number. The system further includes an automated intelligent network (IN) coupled to origination telephone lines, and adapted to process calling card account telephone calls. The IN at least includes a service control point (SCP) having an SCP control unit and an SCP database coupled to the SCP control unit, the IN being adapted to authorize the routing of calling card account telephone calls. The system also includes at least one switch operatively coupled to the origination telephone line and to the SCP, the switch having a service switching point (SSP), and an operator service position system (OSPS) coupled to the SSP, the OSPS adapted to receive command and information signals from a telephone operator, and from a telephone customer via the origination telephone line. The switch routes calls authorized by the SCP to a destination number specified by the customer. And, the system includes an interface between the SSP and the SCP (SSP/SCP interface).

The SCP database at least stores system account numbers and corresponding security information, and the SCP control unit, upon receipt of customer information collected via the origination telephone line, compares information and determines whether a telephone call is authorized. The SCP is adapted to bail out a call to a telephone operator via the SSP/OSPS interface (either the SSP and the OSPS coexist in the same switch or they reside in different switches with signaling links) when a call is unauthorized, the operator then having control over whether the call is routed to its destination.

The present invention also provides, in a telephone calling card service system, a method for processing telephone calls to be charged to calling card accounts. The method at least includes the following steps. Via an input telephonic device operatively coupled to an origination telephone line, transmitting a calling card account card number, security information, and a destination telephone number. Also, via an automated IN coupled to origination telephone lines, processing calling card account telephone calls with an SCP, and authorizing their routing. Via at least one switch operatively coupled to the origination telephone line, and containing an SSP and an OSPS coupled to the SSP, receiving command information signals from a telephone operator, and from a telephone customer via the origination telephone line. Via the switch, the method routes calls authorized by the SCP to the destination number specified by the customer.

The method further includes the steps of, via the SCP, storing system account numbers and corresponding security information, and upon receipt of customer information collected via the origination telephone line, comparing information to determine whether a telephone call is authorized. The method additionally includes the step of, via the SCP, bailing out a call to a telephone operator via the SSP/OSPS interface (either the SSP and the OSPS coexist in the same switch or they reside in different switches with signaling links) when a call is unauthorized, the operator then having control over whether the call is routed to its destination.

BRIEF DESCRIPTION OF THE DRAWING FIGURES

Features and advantages of the present invention will become apparent to those skilled in the art from the description below, with reference to the following drawing figures, in which:

FIG. 2 is a table showing the layout of Destination Routing Addresses used by the present invention;

DESCRIPTION OF THE PREFERRED EMBODIMENTS

1. Basic Hardware

Figure 1:
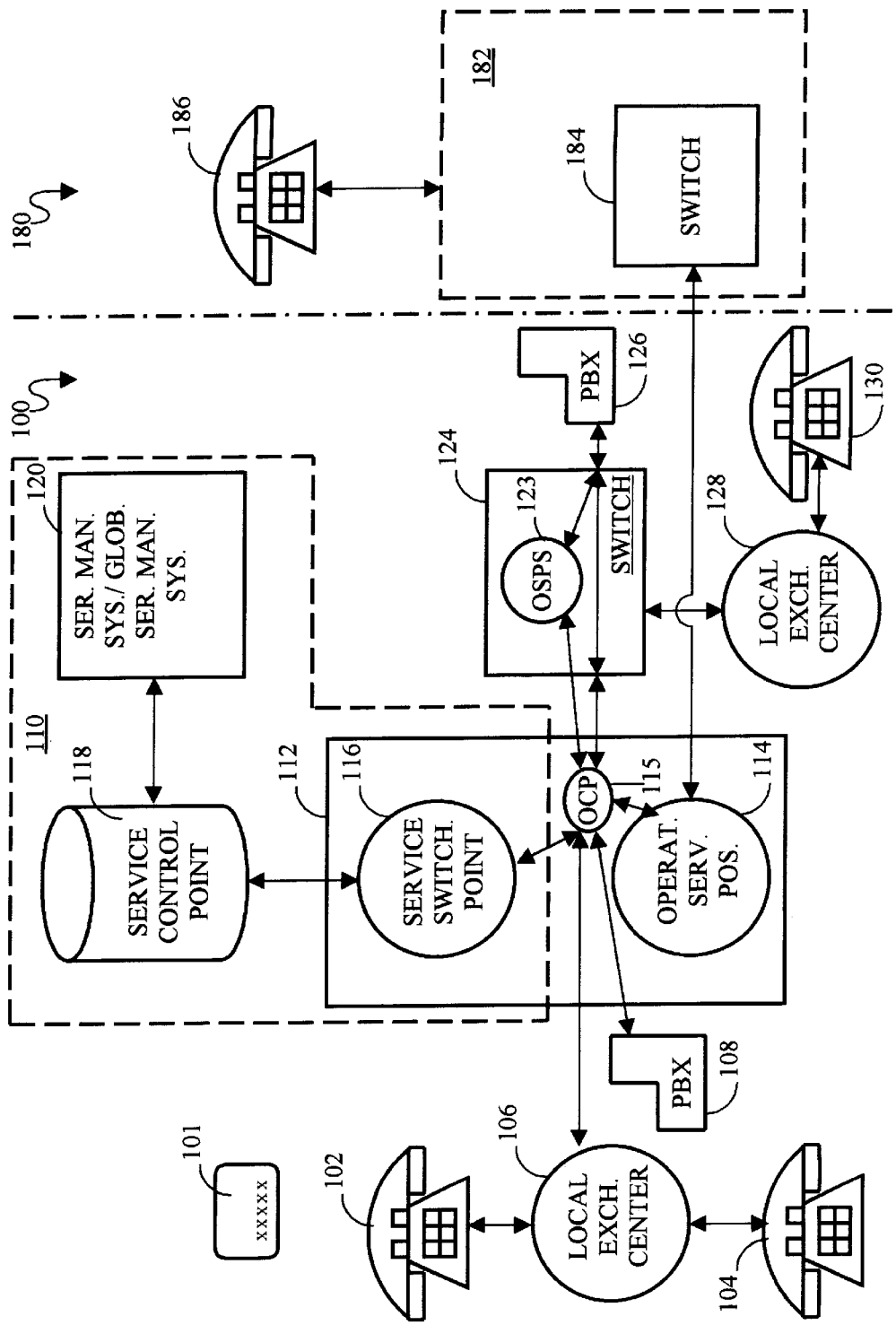
FIG. 1 is a schematic block diagram of the basic hardware for the present-inventive telephone calling card service system.

The basic hardware of the telephone calling card service system 100/180 capable of integrating operator-assisted calls with an intelligent network (IN) is illustrated in FIG. 1.

The system 100/180 combines a domestic network 100, as in the United States, for example, and a foreign network 180, as in Europe, for example. The system 100/180 includes a variety of telephonic input devices as would be common in a general telephone system. For example, a user can connect to the network 100 using such devices as common telephones 102 and 104. As an example, a user can attempt to complete a calling card transaction using a telephone which is part of a private branch exchange (PBX) as is known in the art. The telephones include alphanumeric keypads for inputting Dual-Tone-Multi-Frequency (DTMF) signals, or the like, as is common.

A telephone calling card 101 (or a card number plus PIN) at least stores a card number corresponding to a calling card account, and is used to facilitate a call placement through the system 100/180.

Local exchange centers (LECs) such as the one 106 handle all initial calls, and route calls to a switch 112 when a service access code (SAC) is received, either from the user or from a card reader (not shown) integrated into the telephone terminals. The access number indicates to the LEC that the user desires to make a calling card transaction.

An Original Call Processor (OCP) 115 with the switch 112 transfers the call to a service switching point (SSP) 116. The SSP is part of an intelligent network (IN) 110, capable of automated processing of calling card transactions.

The SSP 116 is linked to a service control point (SCP) 118. The SCP 118 has an extensive database storing calling card numbers supported by the system and their associated account numbers, current account status information, and any other used to facilitate transactions. The SCP 118 performs service logic and provides the SSP 116 with call handling instructions, as provisioned by the system and the calling card subscriber. The SSP 116 also updates the information stored in the SCP 118 (such as new charges to the account) as is appropriate. It will be appreciated by those skilled in the art that the SCP 118 can be implemented as a networked database, not limited to one geographic location.

Once a calling card user is connected to the SSP 116, the SSP 116, queries the SCP 118 for account security information pertaining to the calling card upon which the transaction is based. The SSP 116 also contains a master clock (not shown) for keeping track of current times and dates. In some embodiments, the master clock calibrates other clocks used to measure such quantities as the elapsed time of calls.

Once the SCP 118 receives a query from the SSP 116, the user is prompted to remit information such as the calling card number, PIN, and the destination number (DN) to send to the SCP. If the PIN matches the stored PIN, the transaction continues. If not, the user can be given extra tries to enter the correct PIN. Failing entry of the correct PIN, the IN transfers the call to an operator service position system (OSPS) or customer service center 114 to connect the caller with a telephone operator. Then, the telephone operator can assist the caller by connecting to the destination telephone/telephone number 130 or 126 if appropriate, or terminate the call. The details of this "bailout" operation will be discussed infra.

In the preferred embodiment, a service management system (SMS) or global service management system (GSMS) 120 is employed to provision the calling card account information stored in the system, and to send the needed information to the database of the SCP 118.

A calling card account subscriber can set up an account and establish security and other information related thereto via a customer service center or SMS/GSMS 120. After initial account set-up, modifications (of the PIN, for example) are also made via the SMS/GMS 120. The calling card account subscriber can connect to the SMS/GMS 120 through various means, including direct telephone connection, or by using a computer and Transmission Control Protocol/Internet Protocol (TCP/IP), a networking protocol.

A switch 124 routes an approved telephone call to its final destination as mentioned above.

The OSPS instructs the switch to route the call to its destination number. In addition to destinations such as those represented by the numbers 126 and 130, the switch 112 can also connect a call to a foreign network 180. Similar to the domestic network 100, the foreign network contains an intelligent network 182, including a switch 184 similar to the switch 112. The destination number might be a telephone number (186) in a foreign country. Likewise, the switch 184 of the foreign network 180 may contain an OSPS for facilitating operator-assisted calls.

The interface between the SSP 116 and the SCP 118 uses the ETSI/INAP or ITU/INAP protocol for speed and compatibility. The interface between the SSP 116 and the OSPS 114 uses the switch internal message, and the interface between the SSP 116 and OSPS 123 uses a common channel signaling link or any type of protocols, as will be appreciated by those skilled in the art.

2. Additional System Details

As will be discussed infra., with reference to the table in FIG. 2, and the flowcharts and call flows of FIGS. 3–6, the SCP 118 sends a Destination Routing Address containing bailout information to the SSP of a switch, when a call is determined to meet bail out conditions.

Numerous conditions may occur for which the call flow of the system requires the SCP to bail out a call to a telephone operator for processing. For example, a customer connected to the IN may simply request bailout by dialing "0" or the like. Other bailout conditions might be the failure of the customer to enter the correct calling card and PIN combinations, or the failure to respond in a timely fashion, or the calling card account content is inadequate for the call or contains restrictions against the call. However, bailout conditions recognized by the present invention are not limited to the above-stated examples. In short, any condition which might make the call "unauthorized" in some manner might be used by the call flow as a bailout condition.

When a bailout condition occurs, the SCP 118 sends a "Connect Operation" to an SSP indicating to the SSP that a bailed-out call is to be transferred from the IN to an OSPS for processing by a telephone operator. The Connect Operation includes a Destination Routing Address (DRA) which contains the initial bailout information needed for processing of the call by the switch. The DRA is a series of bytes detailed in FIG. 2 in the preferred embodiment of the present invention.

The DRA includes a Network Routing Address (NRA) which identifies the OSPS to which the SCP desires to transfer the bailed-out call. The DRA also includes a Nature of Address (NOA) which contains a special code indicating the reason of the bailout to the OSPS, so that the SSP and switch will recognize it as a bailout calling card call. In the preferred embodiment, each OSPS of the switches in the system 100/180 has its own unique NRA. The DRA also includes information indicating the reason or reasons for the bailout, which can be used by the telephone operator, example. Other information in the NRA includes the calling card number (CC#) and/or the PIN.

When a Connect Operation is received by an SSP, it sends all information to the OCP 115, which performs digits analysis on the NRA included in the received DRA. Following the result of this digits analysis, one of two methods is used to complete the bailout.

In the methods described below, "A-Party" designates the party originating a telephone call. "B-Party" designates the party receiving the call or the destination number (DN).

3. First Bailout Method (Matching NRAs)

Figure 3:
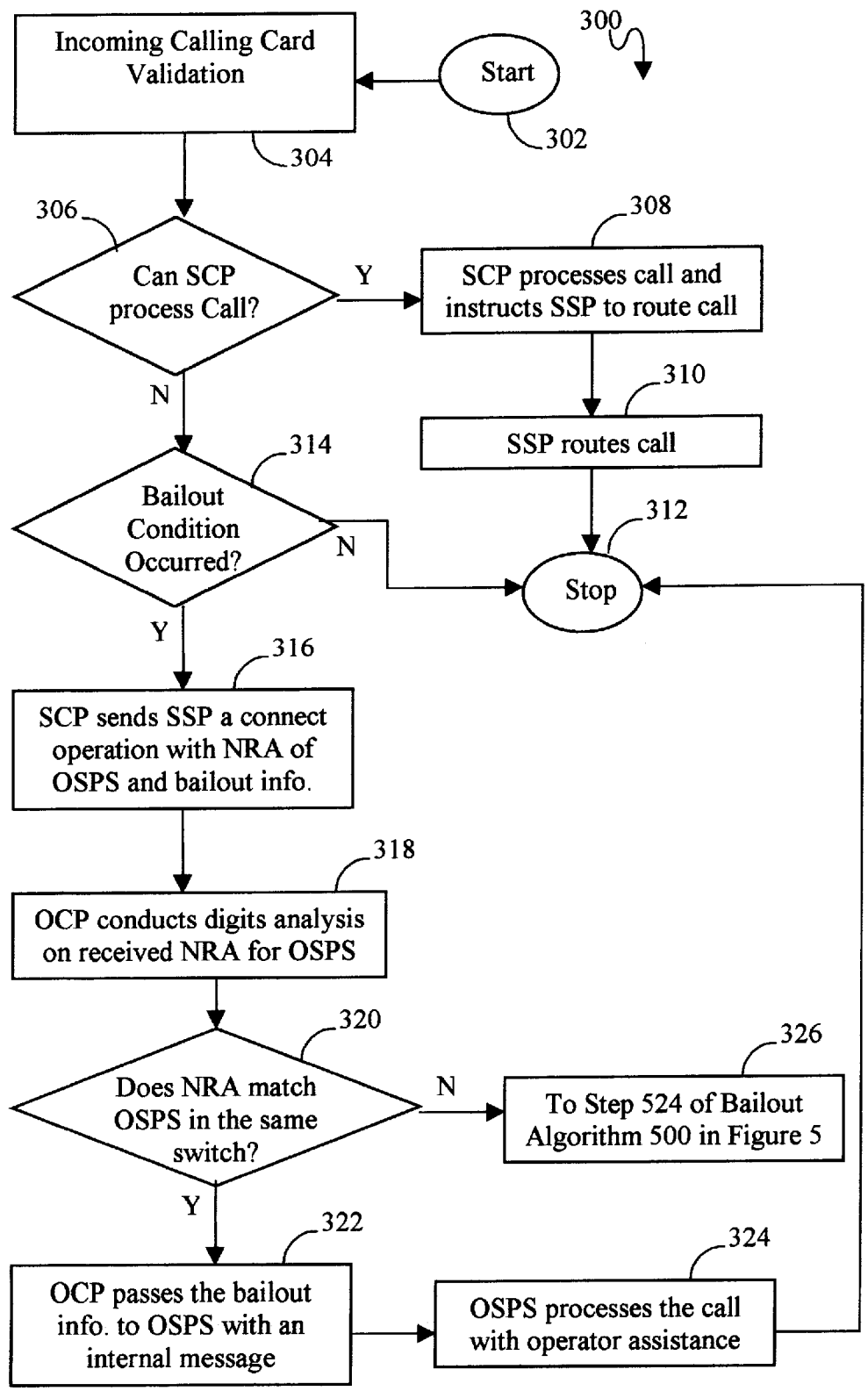
FIG. 3 is a flow chart detailing a first method utilized by the present invention for bailing out an unauthorized telephone calling card transaction to a telephone operator for processing.
Figure 4:
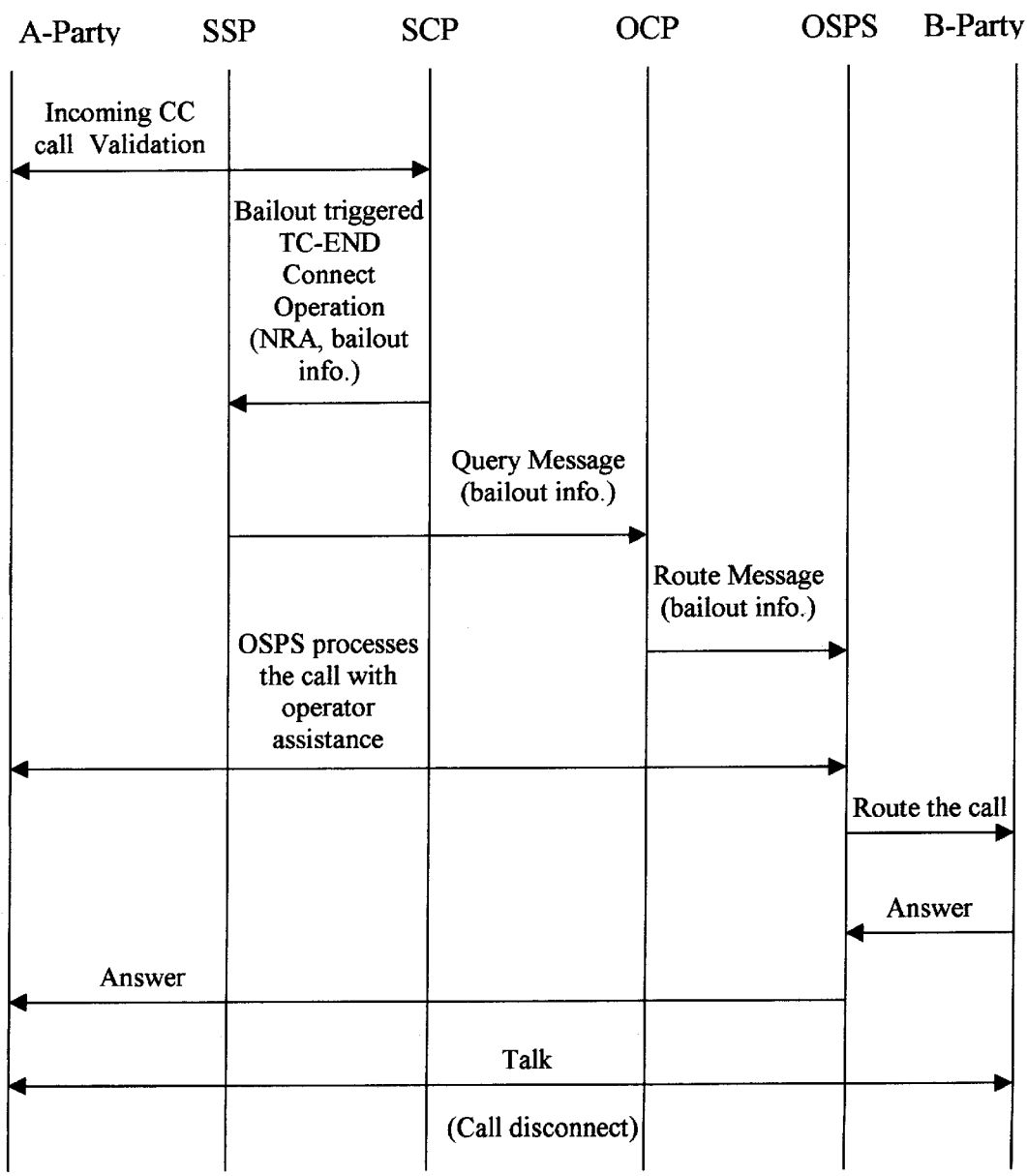
FIG. 4 is a graphical representation of the first method call flow.
Figure 5:
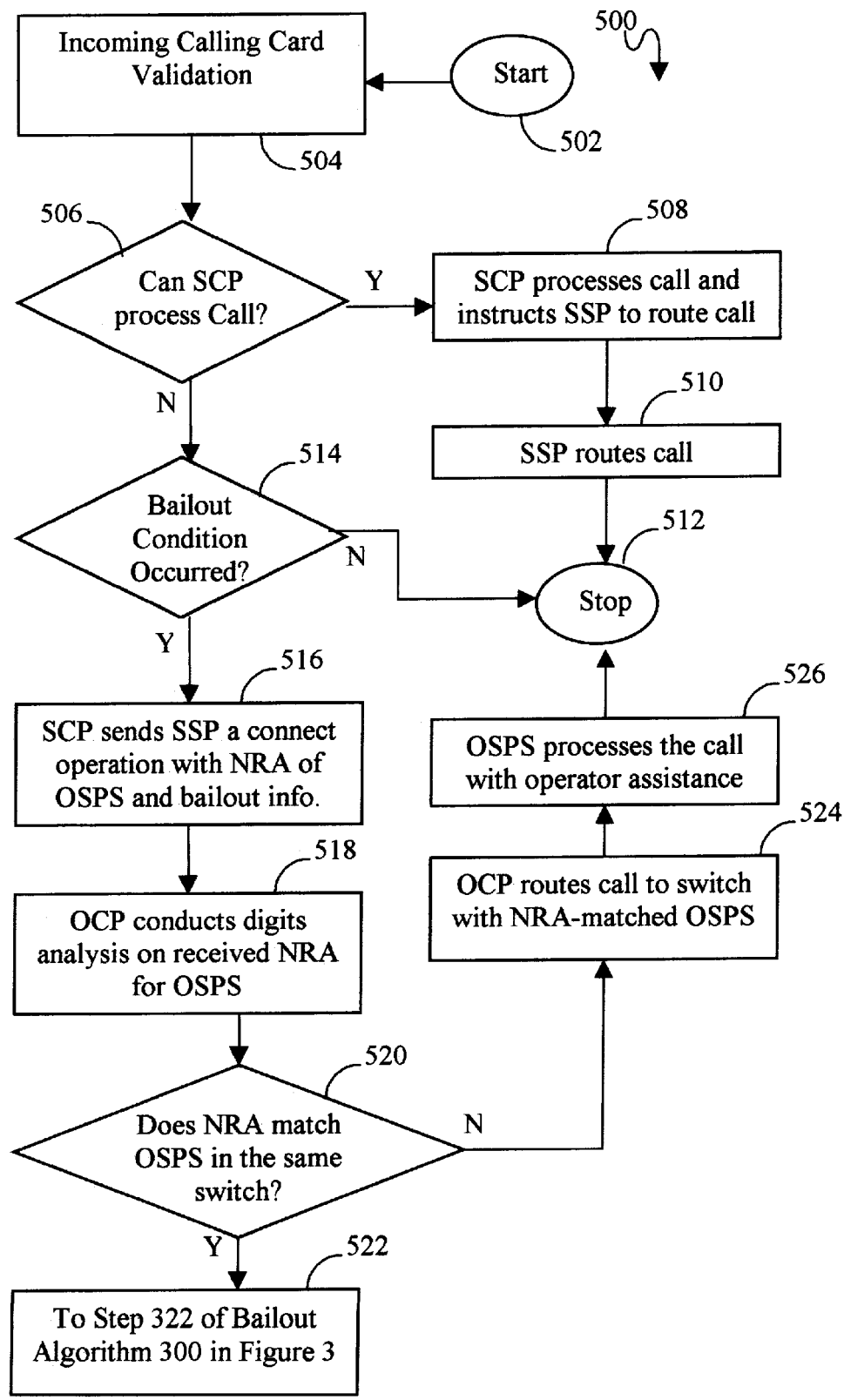
FIG. 5 is a flow chart detailing a second method utilized by the present invention for bailing out an unauthorized telephone calling card transaction to a telephone operator for processing.

When the NRA of the received DRA matches the NRA of the OSPS 115 which co-exists with the SSP in the same switch, the present invention follows the flowchart and call flow shown in FIGS. 3 and 4. The algorithm representing this method is number 300.

After the start (Step 302) of the bailout algorithm 300, the SCP determines whether the calling card is valid in Step 304. Afterwards, the SCP determines whether it can process the call in Step 306. If so, the SCP processes the call and instructs the SSP to route the call in Step 308, which SSP does in Step 310. Having completed the call, the algorithm stops at Step 312.

However, if the SCP cannot process the call, the algorithm goes instead, to Step 314. If no bailout condition has occurred, the call is terminated. If a bailout condition has occurred, the SCP sends a Connect Operation signal with a DRA to an SSP (Step 316), and the SSP passes the information to the OCP.

The OCP performs digits analysis on the NRA included in the received DRA (Step 318). In Step 320, if the NRAs match, the OCP passes the bailout information received in the DRA to the OSPS in the switch along with an internal message instructing the OSPS and hence a telephone operator to process the call. The OSPS processes the call under the control of a telephone operator in Step 324 to complete the transaction.

The call flow diagram shown in FIG. 4 graphically illustrates an example call scenario during the application of the algorithm 300.

4. Second Bailout Method (Non-Matching NRAs)

When the NRA of the SSP does not match the NRA included in the DRA, the algorithm 500 is followed. Steps 502 through 520 are identical to Steps 302 through 320, respectively, of the algorithm 300, detailed above.

During Steps 518 to 520 the SSP passes the bailout information received in the DRA to the switch's OCP with an internal message indicating that the bailed-out call is to be processed. In response, the OCP analyzes the NRA and identifies this NRA as associated with the OSPS 123 in another switch 124 linked to the switch 112. The link can use a number of common channel signaling protocols, as will be appreciated by those skilled in the art to which the present invention pertains.

In Step 524, the OCP transfers the call to the OSPS 123 of the identified switch, whereupon the OSPS of the new switch processes the bailed-out call under the direction of a telephone operator (Step 526).

Figure 6:
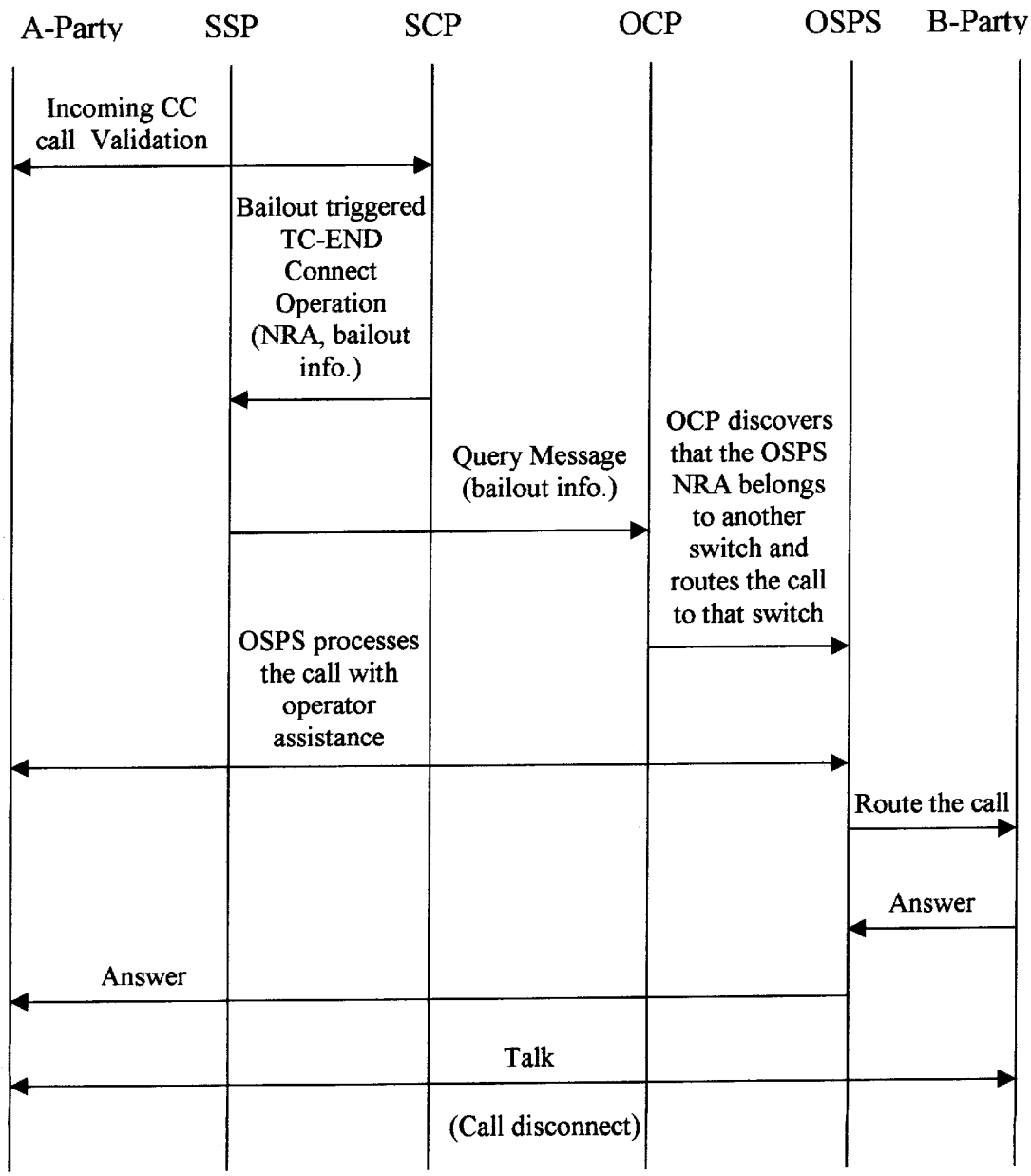
FIG. 6 is a graphical representation of the second method call flow.

FIG. 6 graphically illustrates an example telephone call scenario according to the call flow algorithm 500.

Variations and modifications of the present invention are possible, given the above description. However, all variations and modifications which are obvious to those skilled in the art to which the present invention pertains are considered to be within the scope of the protection granted by this Letters Patent.

For example, both pre-paid and post-paid calling cards may be used in conjunction with the present invention. Further, modifications of the OSPS/SSP/SCP interfaces described above where the aims of the present invention are similar are nonetheless intended to be subsumed by the scope of the present invention.

What is claimed is:

1. A telephone calling card service system for processing telephone calls to be charged to calling card accounts, said system comprising:

an input telephonic device operatively coupled to an origination telephone line, said input telephonic device comprising an alphanumeric information generator adapted to at least transmit a calling card account card number, security information, and a destination telephone number;

an automated intelligent network (IN) coupled to origination telephone lines adapted to process calling card account telephone calls, said IN comprising a service control point (SCP), and said SCP comprising an SCP control unit and an SCP database coupled to said SCP control unit, and a bailout generator adapted to, upon said SCP determining that a call is unauthorized, generate and send to an SSP, Connect Operation signals, said IN being adapted to authorize the routing of calling card account telephone calls;

a plurality of switches operatively coupled to said SCP, said switches comprising a service switching point (SSP), and an operator service position system (OSPS) operatively coupled to said SSP, said OSPS adapted to receive command and information signals from a telephone operator, and from a telephone customer, said switches routing calls authorized by said SCP to a destination number specified by said customer; and an interface between said SSP and said SCP (SSP/SCP interface);

an interface between said SSP and said OSPS (SSP/OSPS interface);

said SCP database at least storing system account numbers and corresponding security information, and said SCP control unit, upon receipt of customer information collected via said origination telephone line, compares information and determines whether a telephone call is authorized; and said SCP being adapted to bail out a call to a telephone operator via said OSPS when a call is unauthorized, said operator then having control over whether said call is routed to its destination;

wherein said Connect Operation signals comprise a Destination Routing Address (DRA) having bailout information; and wherein said DRA comprises a Network Routing Address (NRA) identifying a bailout OSPS within said system, to which a bailed-out call is transferred for further processing, said bailout OSPS not limited to being an element of the switch from which the bailout call is transferred.

2. The system in claim 1, wherein said DRA further comprises CC number and PIN information.

3. The system in claim 1, wherein each said switch comprises an original call processor (OCP) adapted to conduct digits analysis on the NRA in a received DRA; and whereupon a match of a received NRA and the NRA of the OSPS associated with the switch in question causes said OCP to pass bailout information received from said SCP to the OSPS coupled to said SSP, for processing the bailed-out call by a telephone operator.

4. The system in claim 1 wherein said switch further comprises an OCP adapted to conduct digits analysis on the NRA in a received DRA; and whereupon an NRA not matching the NRA associated with the OSPS of the current switch causes said OCP to transfer a bailout call to a suitable second switch, the second switch at least comprising an OSPS to process bailout calls.

5. A telephone calling card service system for processing telephone calls to be charged to calling card accounts, said system comprising:

an input telephonic device operatively coupled to an origination telephone line, said input telephonic device comprising an alphanumeric information generator adapted to at least transmit a calling card account card number, security information, and a destination telephone number;

an automated intelligent network (IN) coupled to origination telephone lines adapted to process calling card account telephone calls, said IN comprising a service control point (SCP), and said SCP comprising an SCP control unit and an SCP database coupled to said SCP control unit, a bailout generator adapted to, upon said SCP determining that a call is unauthorized, generate and send to an SSP, Connect Operation signals comprising a Destination Routing Address (DRA) having bailout information, said IN being adapted to authorize the routing of calling card account telephone calls;

at least one switch operatively coupled to said origination telephone line and to said SCP, said switch comprising a service switching point (SSP), and an operator service position system (OSPS) operatively coupled to said SSP, said OSPS adapted to receive command and information signals from a telephone operator, and from a telephone customer via said origination telephone line, said switch routing calls authorized by said SCP to a destination number specified by said customer;

an interface between said SSP and said SCP (SSP/SCP interface); and an interface between said SSP and said OSPS (SSP/OSPS interface);

said SCP database at least storing system account numbers and corresponding security information, and said SCP control unit, upon receipt of customer information collected via said origination telephone line, compares information and determines whether a telephone call is authorized; and said SCP being adapted to bail out a call to a telephone operator via said OSPS when a call is unauthorized, said operator then having control over whether said call is routed to its destination; and wherein said DRA comprises bailout reason information in the form of a Nature of Address message containing a special code indicating the reason of bailout to said OSPS.

6. In a telephone calling card service system, a method for processing telephone calls to be charged to calling card accounts comprising the steps of:

via an input telephonic device operatively coupled to an origination telephone line, transmitting a calling card account card number, security information, and a destination telephone number;

via an automated intelligent network (IN) coupled to origination telephone lines and comprising a service control point (SCP), processing calling card account telephone calls, and authorizing the routing of calling card account telephone calls;

upon said SCP determining that a call is unauthorized, generating and sending to an SSP, Connect Operation signals;

via at least one of a plurality of switches operatively coupled to said SCP, said switches comprising a service switching point (SSP), and an operator service position system (OSPS) operatively coupled to said SSP, receiving command and information signals from a telephone operator, and from a telephone customer, and routing calls authorized by said SCP to a destination number specified by said customer;

providing an interface between said SSP and said SCP (SSP/SCP interface);

providing an interface between said SSP and said OSPS (SSP/OSPS interface);

via said SCP, at least storing system account numbers and corresponding security information, and upon receipt of customer information collected via said origination telephone line, comparing information and determining whether a telephone call is authorized; and bailing out a call to a telephone operator via said OSPS when a call is unauthorized, said operator then having control over whether said call is routed to its destination;

wherein said Connect Operation signals comprise a Destination Routing Address (DRA) having bailout information; and wherein said Connect Operation comprises a Network Routing Address (NRA) identifying a bailout OSPS within said system, to which a bailed-out call is transferred for further processing, said bailout OSPS not limited to being an element of the switch from which the bailout call is transferred.

7. The method in claim 6, wherein said DRA further comprises CC number and/or PIN information.

8. The method in claim 6, further comprising the steps of:

via an original call processor (OCP) subsumed by each said switch, conducting digits analysis on the NRA in a received DRA; and whereupon a match of a received NRA and the NRA of the OSPS associated with the switch in question causes said OCP to pass bailout information received from said SCP to the OSPS coupled to said SSP, for processing the bailed-out call by a telephone operator.

9. The method in claim 6 further comprising the steps of:

via an OCP subsumed by each said switch, conducting digits analysis on the NRA in a received DRA; and whereupon an NRA not matching the NRA associated with the OSPS of the current switch causes said OCP to transfer a bailout call to a suitable second switch, the second switch at least comprising an OSPS to process bailout calls.

10. In a telephone calling card service system, a method for processing telephone calls to be charged to calling card accounts comprising the steps of:

via an input telephonic device operatively coupled to an origination telephone line, transmitting a calling card account card number, security information, and a destination telephone number;

via an automated intelligent network (IN) coupled to origination telephone lines and comprising a service control point (SCP), processing calling card account telephone calls, and authorizing the routing of calling card account telephone calls;

via at least one switch operatively coupled to said origination telephone line and to said SCP, said switch comprising a service switching point (SSP), and an operator service position system (OSPS) operatively coupled to said SSP, receiving command and information signals from a telephone operator, and from a telephone customer via said origination telephone line, and routing calls authorized by said SCP to a destination number specified by said customer;

providing an interface between said SSP and said SCP (SSP/SCP interface);

providing an interface between said SSP and said OSPS (SSP/OSPS interface);

via said SCP, at least storing system account numbers and corresponding security information, and upon receipt of customer information collected via said origination telephone line, comparing information and determining whether a telephone call is authorized;

upon said SCP determining that a call is unauthorized, generating and sending to an SSP, Connect Operation signals comprising a Destination Routing Address (DRA) having bailout information; and via said SSP, connecting said call to an OSPS for bail-out of the unauthorized call to a telephone operator for further processing, said operator then having control over whether said call is routed to its destination;

wherein said DRA comprises bailout reason information in the form of a Nature of Address message containing a special code indicating the reason of bailout to said OSPS.

* * * * *